United States Patent [19]

Forster

[11] Patent Number: 4,634,150

[45] Date of Patent: Jan. 6, 1987

[54] CONDUIT ARRANGEMENT FOR INTERCONNECTING STATIONARY CONDUIT EXTENSIONS

[75] Inventor: Jürgen Forster, Minden, Fed. Rep. of Germany

[73] Assignee: Deutsche Gesellschaft für Wiederaufarbeitung von Kernbrennstoffen mbH, Hanover, Fed. Rep. of Germany

[21] Appl. No.: 663,445

[22] Filed: Oct. 22, 1984

[30] Foreign Application Priority Data

Nov. 9, 1983 [DE] Fed. Rep. of Germany ....... 3340465

[51] Int. Cl.$^4$ .............................................. F16L 35/00
[52] U.S. Cl. ........................................ 285/24; 285/31; 285/363; 285/912; 285/286; 285/416
[58] Field of Search ........................ 285/24, 25, 26, 27, 285/28, 29, 325, 326, 327, 30, 31, 19, 20, 286, 124, 416, 125, 157, 363, 912; 376/260, 203, 347; 252/627

[56] References Cited

U.S. PATENT DOCUMENTS

| | | | |
|---|---|---|---|
| 1,238,802 | 9/1917 | Nagel | 285/124 |
| 2,301,976 | 11/1942 | Schellens | 285/157 X |
| 3,527,245 | 9/1970 | Lamontagne | 285/31 X |
| 3,817,290 | 6/1974 | Hilgemann | 285/157 X |
| 4,011,532 | 3/1977 | Williams et al. | 285/325 X |
| 4,036,295 | 7/1977 | Kirkland | 285/24 X |
| 4,041,720 | 8/1977 | Lebourg | 285/27 X |
| 4,231,398 | 11/1980 | Gibbons | 285/24 X |
| 4,437,686 | 3/1984 | Wingate | 285/157 X |
| 4,441,403 | 4/1984 | Hansen | 285/325 X |
| 4,471,799 | 9/1984 | Buck | 285/325 X |

*Primary Examiner*—Dave W. Arola
*Attorney, Agent, or Firm*—Walter Ottesen

[57] ABSTRACT

The invention is directed to a connecting arrangement for interconnecting two widely spaced stationary end flanges corresponding to two conduits with an interconnecting conduit section. The two conduits lead to processing components in a large-area cell for reprocessing irradiated nuclear fuels and the processing components are mounted in racks in the cell. When remote-controlled maintenance is carried out and the racks are exchanged, it must be possible for the interconnecting conduit section to be removed simply and quickly by remote-controlled handling and replaced simply and quickly after the exchange is completed. For this purpose, the conduit section has two connecting end flanges lying in respective planes parallel to each other and with their flange engaging surfaces facing in the same direction. The stationary end flanges which have to be interconnected by the conduit section are also arranged parallel to each other and their flange engaging surfaces face in the same direction. The flange engaging surfaces of the two stationary end flanges to be interconnected face in a direction directly opposite to the flange engaging surfaces of the connecting end flanges on the conduit section.

9 Claims, 4 Drawing Figures

CONDUIT ARRANGEMENT FOR INTERCONNECTING STATIONARY CONDUIT EXTENSIONS

FIELD OF THE INVENTION

The invention relates to an arrangement for interconnecting two stationary conduit extensions of two conduits leading to process components in a processing cell such as in a large-area cell for reprocessing irradiated nuclear materials. The process components are mounted in racks which are positioned in the cell.

BACKGROUND OF THE INVENTION

Installations for reprocessing irradiated nuclear fuels have large so-called hot cells wherein the process components are accommodated. These cells are shielded with respect to radiation and contain frames known as racks in which the processing components are mounted.

Maintenance work inside the large radioactive cells has to be performed without personnel entering the cell. Maintenance work is therefore carried out by travelling remote handling apparatus. In this connection, the racks holding the processing components are placed along the walls of the hot cell in a modular configuration to facilitate remote handling. This makes it possible to exchange a complete rack or parts of a rack.

Within the racks, the conduit system for supplying the processing components is almost completely welded. Only a few components which are subject to wear are equipped with detachable conduit connections. The conduit connections between racks and those conduit connections leading to a curtain of conduits at the wall of the cell or to conduits extending through the wall must also be fitted with detachable conduit connections.

When a rack is exchanged, all the conduits which connect two racks directly with one another or which connect a rack to conduits leading through the wall of the cell have to be separated by remote handling and reconnected when a new rack has been installed. It is necessary for whole sections of the conduits to be removed in order to enable the rack to be dismantled, since the conduits would prevent the exchange, that is, the removal of the rack.

Removable conduit connecting units or interconnecting conduit sections known as jumpers are therefore used which have connectable flanges at the respective ends thereof. When a conduit leading through the wall of the cell is connected to a conduit extension in the rack, an interconnecting conduit section is inserted between the stationary end flange of a conduit extension welded to a plate mounted on the wall of the cell and a conduit extension of an apparatus arranged in the rack. The removable conduit sections are then coupled to these two end flanges.

The conduits of the processing components arranged in the rack terminate in conduit extensions mounted on a conduit connecting plate on the rack.

Between the two stationary end flanges of the conduit connecting plates which have to be connected, there is a predetermined space into which the interchangeable or removable interconnecting conduit section is inserted or from which it is removed. The conduit flanges and end flanges are joined together by clamping ring couplings or threaded fastener connections.

The removal or insertion of the conduit section has to be carried out by remote handling. This is not simple, since the operator carrying out the joining process can only watch the process by observing a television monitor and operate accordingly. Attempts to insert the removable conduit section are often unsuccessful.

SUMMARY OF THE INVENTION

It is an object of the invention to provide a conduit arrangement of the type described above which will simplify and facilitate the process of exchanging the removable conduit section interconnecting two stationary conduit extensions in the large-area cell.

The conduit arrangement according to the invention interconnects two stationary end flanges of two conduits leading to process components mounted in racks in an installation such as a large-area cell for reprocessing irradiated nuclear fuel. The two end flanges are separated from each other by a predetermined distance. The conduit arrangement includes: a conduit section for interconnecting the stationary end flanges; the stationary end flanges having respective flange engaging surfaces facing in a first direction and being in respective planes parallel to each other; and, the conduit section having two connecting end flanges at respective ends thereof connectable to corresponding ones of the stationary end flanges. The connecting end flanges have respective flange engaging surfaces facing in a second direction directly opposite to the above-mentioned first direction and the flange engaging surfaces of the connecting end flanges are in corresponding ones of the above-mentioned planes when the conduit section is connected to the stationary end flanges.

When the means clamping the two flange connections have been released by remote handling, the conduit section can be taken out of the connected position by a movement of the crane in only one direction. It is no longer necessary to manipulate the conduit section through several movements in different directions. This facilitates and makes possible the use of stationary centering pins on the separating surfaces of the flanges.

When the maintenance work has been done or a rack has been exchanged, the conduit section for interconnecting the stationary conduit extensions is reinserted by being brought into position by a crane. Only one movement in one direction has to be made in the coupling process.

For the operator, the configuration of the conduit connecting arrangement according to the invention greatly simplifies interconnecting two stationary conduit extensions with a conduit section placed therebetween. The bringing together by remote handling of the flanges of the conduit section with the flanges of the two conduits is faster and is done with greater precision. The interface planes of the flanges are either both vertical or both horizontal, although the vertical arrangement is more advantageous.

It is advantageous to configure the interconnecting conduit section so that it includes a plurality of conduit segments arranged one ahead of the other. Each two adjoining ones of the segments are joined together by a weld seam. Alternatively, the interconnecting conduit section can be one continuous piece of conduit with the connecting end flanges welded to respective ends thereof.

If the end flanges of the conduit section are welded to a curved conduit segment, ready access to the threaded flange fasteners can be obtained by the remotely manipulated tools. The contour path defined by the conduit section is diverted from the central axis of the flange by providing appropriate curves therein.

Conduit sections of the conduit connecting arrangement according to the invention can be exchanged or installed quickly and simply. In this regard, it is a very substantial advantage that the tool which loosens or tightens the two flange connections need only be operated in one plane without changing the working position thereof. This results in considerably faster installation or removal of the pipe conduit lengths to be connected.

BRIEF DESCRIPTION OF THE DRAWING

Three embodiments of the invention will now be explained in greater detail with reference to the accompanying drawing. For the sake of clarity, structure not essential to an understanding of the invention is not illustrated in the drawing wherein.

DESCRIPTION OF THE PREFERRED EMBODIMENTS OF THE INVENTION

Figure 1:
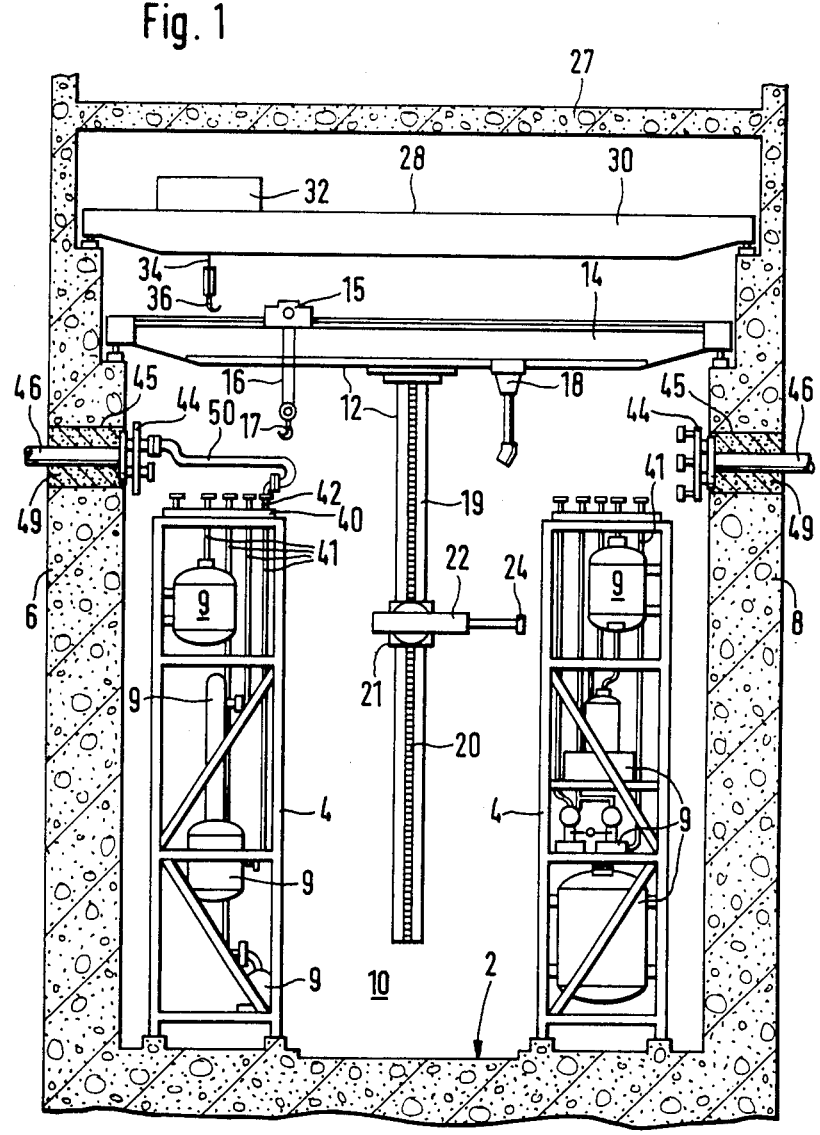
FIG. 1 is a crosssection taken through a large-area cell with racks set up along the walls and with a removable interconnecting conduit section or jumper between a conduit extension of a stationary conduit at the cell wall and a stationary conduit extension at the left-hand rack, the jumpers at the right-hand rack being omitted.

In the large-area cell 2, a plurality of racks 4 are arranged along two mutually adjacent walls 6 and 8 of the cell. The racks 4 can have a grid-like structure and hold the various processing components 9. The two mutually adjacent rows of racks form a central transporting passage 10. A manipulator carrying apparatus 12 is arranged to be movable along the passage 10. The apparatus 12 includes a bridge crane 14 near the top of the cell which can move in a horizontal plane along rails mounted on respective steps in the walls 6, 8 of the cell 2. A trolley 15 is movably mounted on the bridge beam 14 and has a hoist 16 provided with a crane hook 17. A suspended movable television unit 18 is mounted on the bridge beam 14. A vertical guide column 19 is suspended from the beam 14. The column 19 has a vertical linear gear 20.

The guide column 19 is rotatable about its longitudinal axis and is fitted with a support 21 which can move upwardly and downwardly along the linear gear 20. The support carries an extendable arm 22 which is pivotally mounted thereon so as to be eccentric with respect to the column 19. A tool carrying plate 24 is arranged at the end of the arm 22 to which manipulators, tools or other remote handling equipment can be fitted.

A remotely-controllable travelling bridge crane 28 is arranged above the bridge beam 14 of the manipulator carrying apparatus 12 and only a short distance below the cell ceiling 27. The crane 28 is equipped with a trolley 32 which can be moved along the crane beam 30. The bridge crane 28 carries a hook 36 which is movable in the vertical direction on a wire cable 34. An impact wrench or other tools can be suspended from the hook 36 and may be mounted in a special holder.

Figure 2:
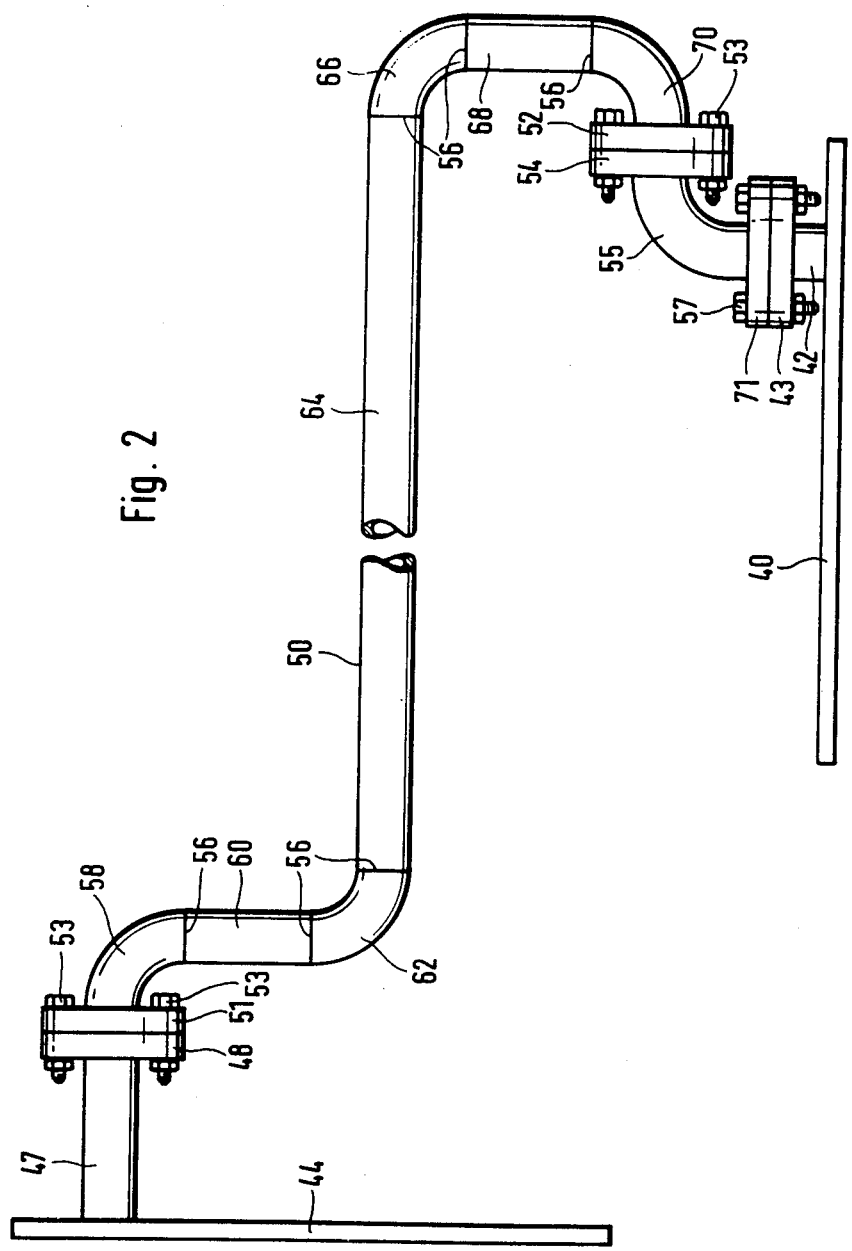
FIG. 2 shows a jumper drawn to a scale larger than in FIG. 1 and arranged between the two end flanges of two stationary conduit extensions.

The racks 4 each have a horizontal conduit connecting plate 40 at the top thereof in which the conduits 41 of the processing components 9 terminate. For each conduit 41, a conduit extension 42 is mounted on the plate 40. The conduit extension includes an end flange 43 to which another conduit piece can be connected (FIG. 2).

A conduit connecting plate 44 for each rack is vertically mounted to the side and above the racks 4 inside the cell 2 and at the cell walls 6, 8. The plates 44 are for conduits 46 brought in through a plug 45 in the cell wall from outside of the cell. The conduit connecting plates 44 also have conduit extensions 47 in which the conduits 46 brought in terminate. The conduit extensions 47 are each provided with an end flange 48 to which another conduit piece can be connected.

The plug 45 in the cell wall is filled with granulated lead 49.

At each rack 4, the conduit extensions 42 and 47 of the two respective conduit connecting plates 40 and 44 are linked by conduit sections 50 also known as removable interconnecting conduit members or jumpers. In FIG. 1, only one conduit section 50 is shown at the left-hand rack 4 for clarity. At the right-hand rack the conduit sections 50 have been omitted to show the dismantled state.

The conduit section 50 (FIG. 2) has a connecting conduit flange 52 at the rack end thereof. The flange 52 is joined by threaded fasteners 53 to an end flange 54 of a curved section of conduit 55, the other end of which is bolted onto the end flange 43 of the conduit extension 42 on the plate 40 by threaded fasteners 57. The conduit extension 42 is extended by the curved section of conduit 55 and presents its connecting surface for the conduit section 50 in the same direction as the conduit extension 47 of the plate 44. The connecting conduit flange 51 of the conduit section 50 is joined to the end flange 48 of the conduit extension 47 of the plate 44 of the cell wall 6. The end flange 48 can be provided with form-tight pockets for holding the nuts of the fasteners 53. When the threaded fasteners 53 have been released, the conduit section 50 can be removed in a horizontal direction by means of the trolley 15. The conduit section 50 can be provided with a carrying loop to facilitate removal thereof.

In the embodiment of FIG. 2, the conduit section 50 is made up of a plurality of conduit segments joined together by welded seams 56. Flanges 51 and 52 are welded to the ends of the conduit section 50 and are parallel with one another. A conduit segment 58 is curved through an angle of 90° and extends from the flange 51. This is joined to a straight conduit segment 60 which is connected to a further conduit segment 62 curved through 90°. The fairly long straight conduit segment 64 following the curved conduit segment 62 is offset parallel with the central axis of the flange 51. The long straight segment 64 ends in a curved segment 66, which is connected by a straight segment 68 to another curved segment 70. The flange 52 is welded to the end of curved segment 70. The last two curved segments 66 and 70 are arranged so that the conduit section 50 is taken through a directional change of 180° in this region.

The conduit extension 42 is provided on the conduit connecting plate 40 of the rack module 4, and its end flange 43 is attached to a flange 71 of the curved intermediate section 55 by threaded fasteners. The other end flange 54 of the intermediate section 55 is fixed to the flange 52 by threaded fasteners 53. The end flange 54 can be provided with form-tight pockets for accommodating the nuts of the threaded fasteners 53.

Figure 3:
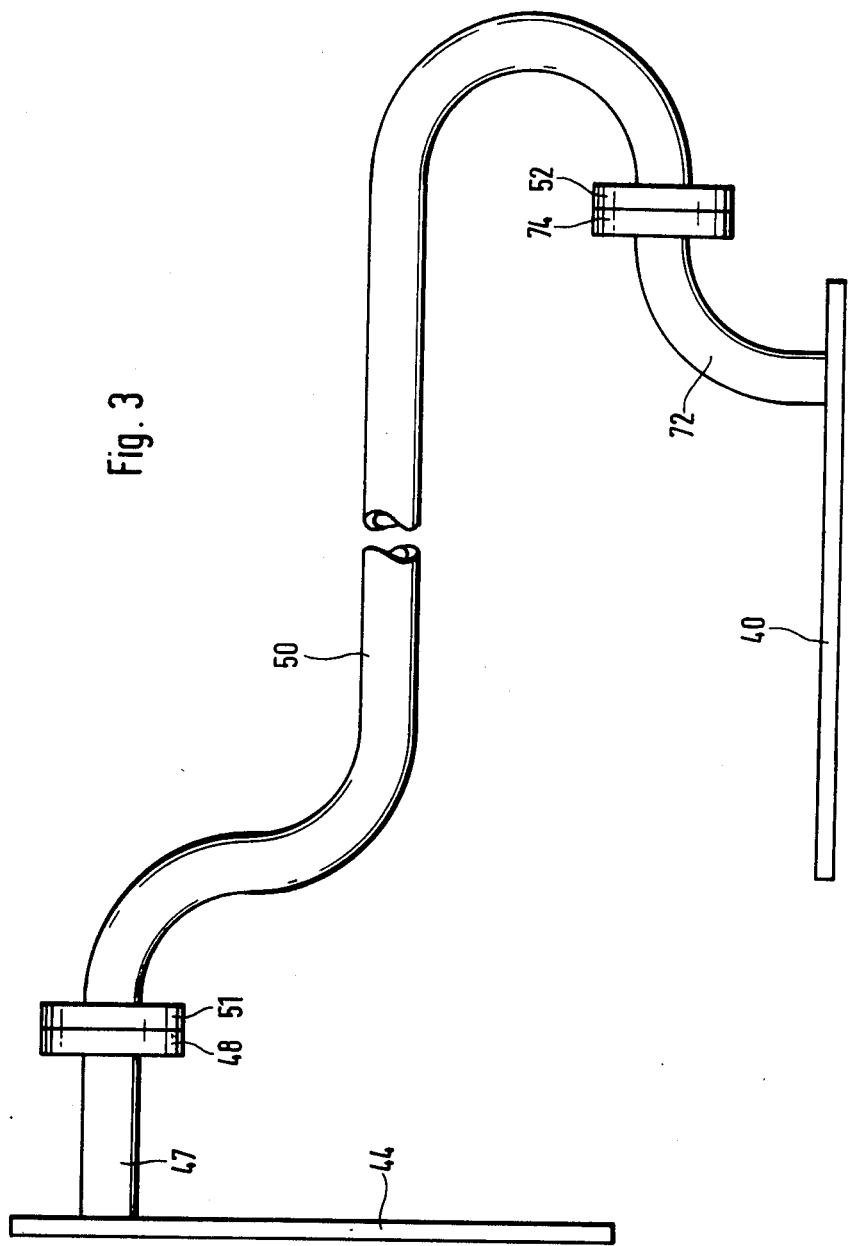
FIG. 3 shows an alternate embodiment of the jumper.

The embodiment shown in FIG. 3 differs from the embodiment of FIG. 2 in that the changes in the direction of the conduit section 50 are obtained with curved conduit portions of larger radius and, in that the conduit section 50 is bent from a single length of conduit. Only the flanges 51 and 52 are welded to the ends of the conduit section 50.

In the conduit arrangement shown in FIG. 3, the conduit extensions 72 on the plate 40 of the rack 4 are already arcuately bent so that the end flange 74 to be joined to the conduit section 50 is parallel with the end flange 48 of the conduit extension 47 on the plate 44 and the connecting surface of end flange 74 faces in the same direction as the connecting surface of end flange 48. With this configuration of conduit section 50, one less flange connection is required.

Figure 4:
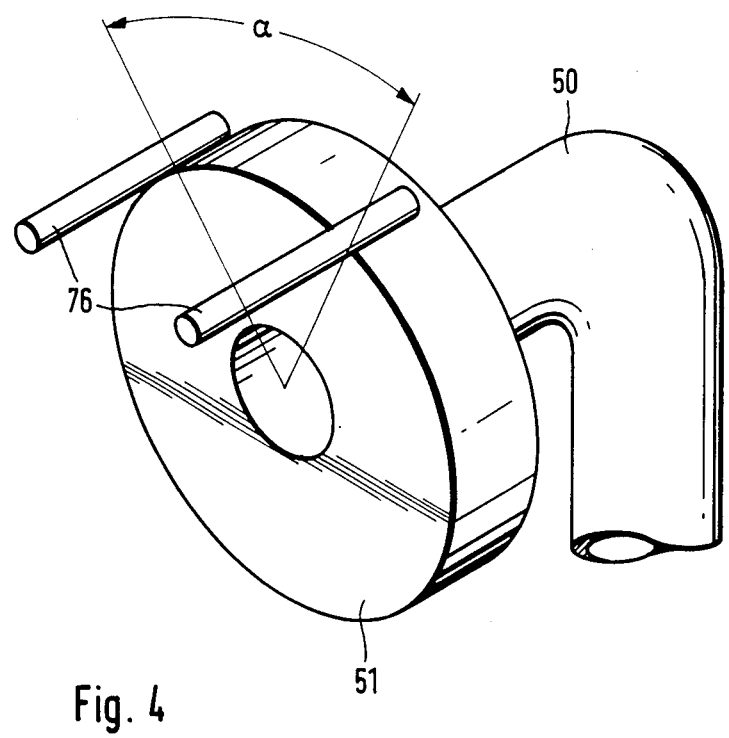
FIG. 4 shows an arrangement for holding the conduit flanges in position.

The two rod-like position holders 76 are shown in FIG. 4 and are welded to the periphery of the flange 51 of the conduit section 50. The position holders conjointly define an angle α of 90° with the center of the flange 51, and the line bisecting the angle α extends vertically in the plane of the flange 51.

The operation of the arrangement described above will now be explained.

If a rack 4 or part of a rack has to be exchanged, the conduit connections between the conduit connection plate 40 of the rack 4 and the conduit connection plate 44 of the cell wall are first released and the conduit section 50 removed. An impact wrench carried by the bridge crane 28 is used to release the threaded fasteners 53 from the coupled flanges 48, 51 and 52, 54 shown in FIG. 2 and flanges 48, 51 and 52, 74 for the embodiment shown in FIG. 3. The impact wrench can work on both flange connections without changing the angle of its operating position. The conduit section 50 is thereupon moved out of the connected position in a horizontal direction by means of the trolley 15 and hoist associated therewith. The conduit section 50 can be transported by the trolley 15 into a free region within the cell 2. The rack 4 is now freed so that it can be exchanged.

When the rack 4 has been exchanged, the conduit extensions 42 and 47 (FIG. 2) or 47 and 72 (FIG. 3) have to be reconnected. For this purpose, the conduit section 50 in question is brought to the elevation of the connecting position by means of the trolley 15. The conduit section 50 is brought up horizontally against the flanges 48, 54 (FIG. 2) and 48, 74 (FIG. 3) of the plates 44 and 40 at creep speed. A television unit enables the operator to monitor and carry out the insertion and placement of the conduit section 50 on the television screen.

When the flanges 48, 51 and 52, 54 (FIG. 2) or 48, 51 and 52, 74 (FIG. 3) have been brought together, they are joined by an impact wrench carried by the bridge crane 28 which retightens the threaded fasteners 53.

It is understood that the foregoing description is that of the preferred embodiments of the invention and that various changes and modifications may be made thereto without departing from the spirit and scope of the invention as defined in the appended claims.

What is claimed is:

1. A conduit arrangement for interconnecting two stationary end flanges of two pipe conduits leading to a process component arranged in a large-area cell for reprocessing irradiated nuclear fuel, the large-area cell being equipped with a rack for accommodating the process component therein, the two end flanges being separated from each other by a predetermined distance and the conduit arrangement comprising:

a conduit section for interconnecting said stationary end flanges;

said stationary end flanges having respective flange engaging surfaces facing in a first direction and being in respective planes parallel to each other;

said conduit section having two connecting end flanges at respective ends thereof connectable to corresponding ones of said stationary end flanges, by connecting means said connecting end flanges having respective flange engaging surfaces facing in a second direction directly opposite to said first direction, said flange engaging surfaces of said connecting end flanges being in corresponding ones of said planes when said conduit section is connected by said connecting means to said stationary end flanges;

a first conduit connecting plate mounted on a wall of the large-area cell, a first conduit extension arranged on said first plate and a first one of said stationary end flanges being mounted on said first conduit extension; and, a second conduit connecting plate mounted on the rack, a second conduit extension arranged on said second plate and the second one of said stationary end flanges being mounted on said second conduit extension, the two pipe conduits terminating in corresponding ones of said conduit extensions.

2. The conduit arrangement of claim 1, said second conduit extension including a straight conduit section extending upwardly from said second plate; and, a curved conduit section connected to said straight conduit section, said second stationary end flange being mounted at the outer end of said curved conduit section so as to be parallel to said first stationary end flange and to cause said flange engaging surface of said second stationary end flange to face in said first direction.

3. The conduit arrangement of claim 1, said second conduit extension being a conduit section curved so as to cause said second stationary end flange to lie parallel to said first stationary end flange and to cause said flange engaging surface of said second stationary end flange to face in said one direction.

4. The conduit arrangement of claim 1, said conduit section including: a plurality of conduit segments arranged one ahead of the other; and, a weld seam joining each two mutually adjacent ones of said segments to each other.

5. The conduit arrangement of claim 1, said conduit section being one continuous piece of conduit, said connecting end flanges being welded to respective ends of said piece of conduit.

6. The conduit arrangement of claim 2, said conduit section including a plurality of conduit segments arranged one ahead of the other; and, means for joining each two mutually adjacent ones of said segments to each other; said connecting end flanges being welded to respective ones of the two conduit segments defining the two ends of said conduit section, said two conduit segments being curved conduit segments.

7. The arrangement of claim 1, comprising: positioning means formed on said connecting end flanges for positioning said conduit section relative to said stationary end flanges.

8. The arrangement of claim 7, said positioning means including two positioning rods attached to the peripheral edge of each one of said connecting end flanges, said connecting end flange having a central axis perpendicular to the flange engaging surface thereof, said two rods being attached to said edge so as to extend outwardly therefrom toward the stationary end flange coupled thereto and so as to be parallel to said central axis, said positioning rods being arranged on the upwardly facing portion of said peripheral edge so that the radii extending in the plane of said surface to said central axis conjointly define an angle $\alpha$ in the range 45° to 120°.

9. The arrangement of claim 8, said rods being disposed on said peripheral edge so as to cause a vertical line passing through said central axis and lying in said last-mentioned plane to bisect said acute angle into two equal acute angles.

* * * * *